United States Patent [19]

Peeters

[11] 4,174,487
[45] Nov. 13, 1979

[54] MIRROR CONDENSER LAMP

[75] Inventor: Jozef C. I. Peeters, Eindhoven, Netherlands

[73] Assignee: U.S. Philips Corporation, New York, N.Y.

[21] Appl. No.: 775,455

[22] Filed: Mar. 8, 1977

[30] Foreign Application Priority Data

Mar. 10, 1976 [NL] Netherlands .......................... 7602483

[51] Int. Cl.$^2$ ............................................. H01J 61/40
[52] U.S. Cl. ..................................... 313/113; 313/184; 313/225
[58] Field of Search ............... 313/113, 114, 115, 184, 313/225

[56] References Cited

U.S. PATENT DOCUMENTS

| | | | |
|---|---|---|---|
| 3,882,353 | 5/1975 | Ackley | 313/115 X |
| 3,983,513 | 9/1976 | DeCaro | 313/113 |
| 4,041,344 | 8/1977 | La Glusa | 313/113 |

Primary Examiner—Rudolph V. Rolinec
Assistant Examiner—Darwin R. Hostetter
Attorney, Agent, or Firm—Robert S. Smith

[57] ABSTRACT

A mirror condenser lamp has significantly smaller dimensions than prior art lamps. The current supply conductors extend from the intersection of a reflector portion and a lens portion.

2 Claims, 2 Drawing Figures

MIRROR CONDENSER LAMP

The invention relates to a mirror condenser lamp comprising (a) a glass lamp vessel having a rotationally symmetrically curved mirrored wall portion and a rotationally symmetrically curved transparent wall portion, a cylindrical wall portion extending from the line of intersection of the two curved portions, (b) a tungsten filament connected to current supply conductors and arranged in the lamp vessel in such manner that the filament surrounds the focus of the mirrored wall portion situated within the lamp vessel, (c) a vacuum-tight seal in the cylindrical portion of the lamp vessel through which the current supply conductors are passed to the exterior, and (d) an inert gas-containing atmosphere in the lamp vessel.

Such lamps are known inter alia from German Pat. No. 1,023,525. They are destined for use in sub-standard film projectors. In order to achieve that the lamps have a high colour temperature and a high brightness, the filament is designed so that it has a very high temperature during operation at design voltage.

In order to shield both the mirror and the light window of the lamp during the whole life from tungsten deposition, the known lamps comprise a dome-shaped bulge which is situated diametrically opposite to the cylindrical wall portion and in which the tungsten deposition is concentrated under the influence of the convection currents.

As a result of the bulkiness of the lamp vessel of the known lamps and the mechanical weakness associated therewith, only a low gas pressure can prevail in said lamps. As a result of this and due to the high temperature of the filament the life of the known lamps is restricted to 15 to 25 hours.

Not only in sub-standard film projection apparatus, but also in other apparatus in which light sources are used, for example reading apparatuses, balances and the like, there is the tendency towards a more compact construction. With lamps of the known type it is not possible to follow said tendency.

It is the object of the invention to provide mirror condenser lamps with which the present requirement for minaturisation of apparatuses in which light sources are used, in particular projection apparatuses, is met and which also have a longer life at an at least equal filament temperature.

Accordingly, the invention provides a mirror condenser lamp of the kind mentioned in the preamble which is characterized in that the gas atmosphere has a pressure of more than 1 atmosphere and comprises halogen, in that the lamp vessel consists of a halogen-resistent hard glass having a softening temperature of at least 500° C., and the inside of the wall of the lamp vessel during operation assumes a temperature at which tungsten halogen compounds are volatile.

Although it is known that lamps having a tungsten halogen cycle can be made from halogen-resistent hard glass (see, for example, the U.S. Pat. Nos. 3,648,094 and 3,829,729), all the said lamps, as well as halogen lamps of quartz glass, have a cylindrical lamp vessel.

It has now surprisingly been found possible to manufacture lamps of the above-described shape deviating considerably from the cylinder with which it is possible on the one hand to illuminate the window of sub-standard film projection apparatuses completely and uniformly, while on the other hand the inner wall of the lamp vessel nevertheless assumes a temperature everywhere at which tungsten halogen compounds are volatile so that blackening of the lamp vessel is prevented. The small dimensions of the lamp which are necessary to reach the required minimum wall temperature enable high filling pressures to be used as a result of which the lamps have a longer life and the filament can be loaded more highly.

In lamps according to the invention the previously used dome-shaped bulge of the lamp vessel is superfluous since no place need be provided where tungsten can deposit without thereby deteriorating the luminous efficiency of the lamp. In the new lamps such a bulge is even undesired since the wall of the lamp vessel would have too low a temperature at that area—the wall temperature should be at least 200° C. at any site—to cause the halogen/tungsten cycle to take place and since such a bulge would reduce the active surface area of the mirrored wall portion.

Therefore, the line of intersection of the curved mirrored wall portion and the curved transparent wall portion is substantially circular except where the cylindrical wall ortion is situated.

The cylindrical part of the lamp vessel is preferably chosen to be as short as possible, that is, not longer than is necessary to be able to realise the vacuumtight seal of the lamp vessel. As a rule, the length of the cylindrical portion of the lamp vessel measured between the circular line of intersection of the curved wall portions of the lamp vessel and the vacuum-tight seal will be at most 5 mm.

An advantage of this lamp construction is that the current supply wires are led through to the exterior in a direction transverse to the beam of rays. As compared with the reflector lamps in which the current supply wires are led through to the exterior along the optical axis of the reflector this means a considerable increase of the effectively reflective surface area.

Lamps according to the invention cannot only be used in sub-standard film projectors but also for the projection of 16 mm films and transparencies for microscope illumination in micro reading apparatus and balances. Furthermore the lamps may be used as spot lights, bicycle lamps and moped lamps, signalling lamps and the like.

Lamps for the last-mentioned applications as a rule have a paraboloidal mirrored wall portion, whereas in lamps for the first-mentioned applications said wall portion usually is curved ellipsoidally. The transparent wall portion is usually spherical or hyperboloidal.

The lamps according to the invention are significantly smaller that the said known lamps of the same power, so that they give the designer of apparatus ample possibilities as regards extensive miniaturisation. The diameter of the above-described circular line of intersection and the largest dimension transverse to the plane defined by said line are in the lamps as a rule between 10 and 40 mm.

The lamp vessel is made from halogen-resistent hard glass having a softening temperature of at least 500° C. As such are to be considered primarily alkali-aluminoborosilicate glasses having a coefficient of expansion of $31-37 \times 10^{-7}$ °C.$^{-1}$ at 0–300° C. Said glasses contain 77–81% by weight of $SiO_2$, 12–15% by weight of $B_2O_3$, 3–5.5% by weight of $Na_2O$ and 1.5–2.5% by weight of $Al_2O_3$ and are commercially available inter alia under the trade name "Pyrex". For example, a glass as mentioned in the above U.S. Pat. No. 3,829,729 may also be used.

The lamp vessel may be manufactured, for example, by heating a glass tube which is closed at one end and blowing to the desired shape in a mould. An exhaust tube is preferably provided on the line of intersection of the two curved wall portions. Although said exhaust tube can be sealed at the end of the production process so that the line of intersection of the two curved wall portions except for the site where the cylindrical wall portion is present, is substantially circular, it is alternatively possible to keep an open exhaust duct in the seal, for example a pinch seal which is present in the cylindrical part of the lamp vessel, which exhaust duct is sealed at the end of the production process.

In a simple embodiment the mirrored wall portion of the lamp has a metal layer, for example, a layer of silver or aluminium on the outside. However, it is alternatively possible for said wall portion to have an interference mirror so that it reflects visible radiation and passes thermal radiation.

The transparent wall portion may be provided with a light pervious filter which reflects thermal radiation. In that case the other curved wall portion may be provided with a metal layer. When the mirrored wall portion is curved ellipsoidally, the transparent wall portion is preferably curved hyperboloidally.

The foci of the mirrored wall portion and the transparent wall portion are preferably made to coincide.

Bromine is to be preferred as a halogen for the tungsten/halogen cycle. This substance may be dosed as such, possibly together with hydrogen, or as a compound, for example, hydrogen bromide or a brominated hydrocarbon.

A lamp of the invention will be described in greater detail with reference to the figures and the examples.

Figure 1:
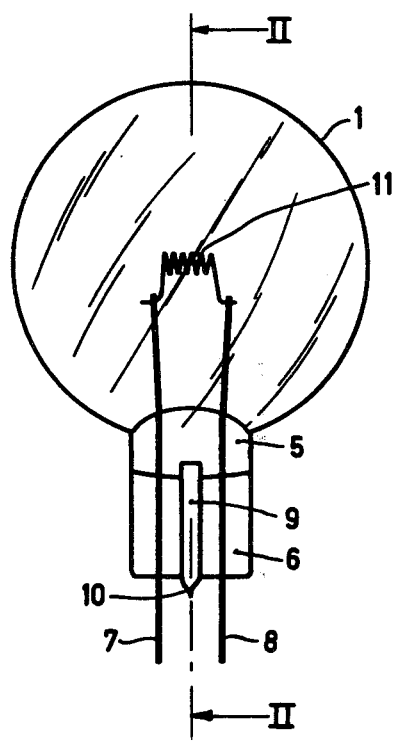
FIG. 1 is a front elevation of a lamp, two times enlarged.
Figure 2:
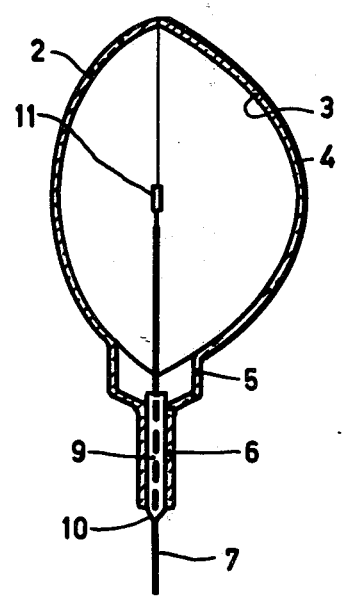
FIG. 2 is a longitudinal sectional view taken on the line II—II.

A hard glass vessel 1 has a curved transparent wall portion 2 and a curved wall portion 3 which is provided with a reflecting layer 4. On the line of intersection of the two curved wall portions is situated a cylindrical part 5 terminating in a pinch seal 6. Current conductors 7 and 8 are led through said seal in a vacuum-tight manner. An exhaust duct 9 is sealed at 10 outside the pinch seal. The current conductors support a filament 11 which surrounds the focus of the curved mirrored wall portion.

EXAMPLE.

A hard glass tube, outside diameter 8 mm, sealed at one end was blown in a mould to form a lamp vessel for a lamp according to the invention. The wall portion destined for mirroring was curved ellipsoidally. Half the long axis of the ellipsoid was 23.4 mm long. Half the focal distance was 14 mm. The other curved wall portion, destined to serve as a light window, was curved hyperboloidally: half the distance between the branches of the hyperboloid 8.4 mm, half focal distance 14 mm. The circular line of intersection of these two curved portions had a diameter of 30 mm. The largest dimension of the lamp vessel at right angles to the plane of the circular line of intersection was 15 mm.

Molybdenum current conductors, diameter 400 μm, were provided with a glass bead by fusing a capillary (inside diameter 420 μm, outside diameter 600μm) on the conductors. The current conductors were provided with a tungsten filament after which the assembly was inserted into the lamp vessel via the cylindrical portion over such a distance that the coinciding foci of the ellipsoidally and hyperboloidally curved portions were within the filament. The longitudinal axis of the filament was arranged at right angles to the optical axis of the lamp vessel. After sliding a glass tube, in which a metal mandrel was arranged, between the current conductors into the aperture of the lamp vessel, the lamp vessel was sealed for the greater part by a pinching process. After removing the metal mandrel, the lamp vessel was evacuated via the exhaust aperture and filled with 3 Torr HBr and 3 atm. krypton, after which the exhaust aperture was sealed.

The ellipsoidally curved wall portion was mirrored with silver and then coated with aluminium paint. The lamp consumed a power of 50 W at 8 V.

The glass used had a composition of 80.5% by weight of $SiO_2$, 13% by weight of $B_2O_3$, 3.5% by weight of $Na_2O$, 0.7% by weight of $K_2O$ and 2.3% by weight of $Al_2O_3$. In the figures said lamp is shown two times enlarged.

In a second embodiment the hyperboloidally curved wall portion was covered on the outside with an interference filter reflecting thermal radiation and constructed from 5 pairs of layers of ZnS and $MgF_2$. In this lamp the exhaust tube seal was positioned on the substantially circular line of intersection of the ellipsoidal and the hyperboloidal wall portion, diametrically opposite to the cylindrical portion of the lamp vessel.

What is claimed is:

1. A mirror condenser lamp comprising:
   a glass lamp vessel having a rotationally symmetrically dished mirrored wall portion having a focus and a rotationally symmetrically dished transparent wall portion, said portions being disposed in facing and abutting relationship with the intersection therebetween being a curvillinear line of intersection, a cylindrical wall portion extending from said line of intersection of said two dished portions,
   a tungsten filament and current supply wires connected to said filament, said filament being disposed in said lamp vessel surrounding the focus of said mirrored wall portion and within said lamp vessel, said current supply wires extending through said line of intersection, in substantially a transverse direction to light rays being reflected from said dished mirrored wall portion,
   a vacuum-tight seal in said cylindrical portion of said lamp vessel through which said current supply conductors are passed to the exterior of said vessel, and
   an inert gas-containing atmosphere in said lamp vessel, said gas atmosphere has a pressure of more than 1 atmosphere and containing a halogen, said lamp vessel consisting of a halogen-resistant hard glass having a softening temperature of at least 500° C., said vessel being dimensioned so the inside of the wall of the lamp vessel during operation assumes a temperature at which tungsten-halogen compounds are volatile.

2. A mirror condenser lamp as claimed in claim 1, wherein said line of intersection of said dished mirrored wall portion and said dished transparent wall portion of said lamp vessel is substantially circular except where said cylindrical wall portion is situated.

* * * * *